United States Patent [19]
Grant et al.

[11] Patent Number: 6,070,188
[45] Date of Patent: May 30, 2000

[54] TELECOMMUNICATIONS NETWORK MANAGEMENT SYSTEM

[75] Inventors: Colin Grant; Matthew Faupel; Graham French, all of Cambridge, United Kingdom; Päivi Teriaho, Espoo, Finland

[73] Assignee: Nokia Telecommunications Oy, Espoo, Finland

[21] Appl. No.: 09/091,387

[22] PCT Filed: Dec. 20, 1996

[86] PCT No.: PCT/FI96/00690

§ 371 Date: Jun. 16, 1998

§ 102(e) Date: Jun. 16, 1998

[87] PCT Pub. No.: WO97/24837

PCT Pub. Date: Jul. 10, 1997

[30] Foreign Application Priority Data

Dec. 28, 1995 [GB] United Kingdom .................... 9526614

[51] Int. Cl.[7] ...................................................... G06F 15/16
[52] U.S. Cl. ........................... 709/223; 709/224; 709/244
[58] Field of Search ..................................... 709/223, 224, 709/244, 201; 379/242

[56] References Cited

U.S. PATENT DOCUMENTS

| | | | |
|---|---|---|---|
| 5,799,153 | 8/1998 | Blau et al. ................................ | 709/223 |
| 5,941,978 | 8/1999 | Finni ...................................... | 709/201 |

FOREIGN PATENT DOCUMENTS

| | | |
|---|---|---|
| 2 308 777 | 7/1997 | United Kingdom . |
| 2 308 778 | 7/1997 | United Kingdom . |
| WO 93/18598 | 9/1993 | WIPO . |
| WO94/06232 | 3/1994 | WIPO . |
| WO 95/20297 | 7/1995 | WIPO . |
| WO95/20297 | 7/1995 | WIPO . |
| WO96/21324 | 7/1996 | WIPO . |
| WO97/24836 | 7/1997 | WIPO . |

OTHER PUBLICATIONS

Muralidharan, Baktha, *IEEE Journal on Selected Areas in Communications*, vol. II, No. 9, "Multiprotocol Management Agents: A Look at an Implementation and the Issues to Consider", pp. 1336–1345.

Koyanagi, et al., *IEEE Global Telecommunications Conference Record,* "Hierarchically Structured Switching Software", pp. 1918–1922.

A copy of the International Search Report for PCT/FI96/00690.

"Specifications of Signalling System No. 7, Q3 Interface—Lower Layer Protocol Profiles for the Q3 Interface", ITU–T Recommendation Q.811, pp. 1–32, Mar. 1993.

"Specifications of Signalling System No. 7, Q3 Interface—Upper Layer Protocol Profiles for the Q3 Interface", ITU–T Recommendation Q.812, pp. 1–24, Mar. 1993.

*Primary Examiner*—Frank J. Asta
*Assistant Examiner*—Almari Romero
*Attorney, Agent, or Firm*—Altera Law Group, LLC

[57] ABSTRACT

In a system for managing a telecommunications network the transmission network to be managed is connected to the management system by means of interface processes in such a way that devices used in the network are classified into different device categories (MD, SXC, SDH), the system comprising for each device category an interface process (IPI-IP3) which converts a device belonging to the concerned device category so that it appears, as viewed from the direction of the management system, as a generic basic device corresponding to a device represented by corresponding objects within the management system.

5 Claims, 3 Drawing Sheets

TELECOMMUNICATIONS NETWORK MANAGEMENT SYSTEM

BACKGROUND OF THE INVENTION

The present invention relates to a management system according to the preamble of attached claim 1 for managing a telecommunications network. The telecommunications network to be managed may be e.g. a SDH (Synchronous Digital Hierarchy) network, a PDH (Plesiochronous Digital Hierarchy) network, or a combination of such networks.

The basic situation in network management is usually such that an operator managing a telecommunication networks, e.g. a telephone company, has a plurality of customers (i.e. network users) in addition to the physical network. The operator sells the customers various services that utilize the network. (A public network will be used herein as an example; in principle, however, the same description applies to a private operator managing e.g. an organisation network). To meet customers' data transmission requirements in the physical network, the operator utilises a number of facilities or operative processes for the provision of customer services. These operative processes can be divided into groups in accordance with the functions for which they are intended:

Service Provisioning taking care of the performance of customer services, including e.g. invoicing customers for services.

Operation & Maintenance for keeping the network operative to allow the usage of customer services. One of the most important functions in this respect is the supervision and repair of network faults.

Planning & Development, the function of which is to develop network operation so as to better meet customers' needs and to increase the overall profitability of the operator enterprise.

As appears from the above, network management takes place on several different levels, depending on the extent to which the functions to be performed on a specific level are associated with the overall management of the operator enterprise. The management of a telecommunications network is generally divided into four different levels, which are from bottom to top as follows:

network element management layer, network management layer, service management layer, and business management layer.

This division is used e.g. in the ITU-T (the former CCITT) recommendation M.3010, which specifies a kind of framework for the management architecture of a telecommunications network. The bottom layer below the above four layers is the equipment itself; these equipments are managed by installation and field engineering tools.

The network element management layer means the management of an individual network element (such as a multiplexer or a cross-connection device) as a separate component without simultaneously paying attention to the condition of the network or other network elements. The majority of so called "network management" systems commercially available today are actually network element management systems within this layer.

The network management layer is concerned with the management of the entire telecommunications network, such as overall management of network connections. One example is the creation of connections and the end-to-end supervision of their condition. This means that e.g. alarms detected on equipment are not just displayed against that equipment, but they are also propagated to show what services (paths and circuits) are affected by the fault, if any. The present invention is positioned in this layer.

As distinct from the above, the service management layer is not concerned with technical network management. It takes care of e.g. customer data, supervision of services provided to customers, invoicing for services, and considering needs for services of different types.

The business management layer is used to monitor and plan the business activities and economy of the entire enterprise, resulting in decisions affecting the lower levels.

At present, network management systems are changing into systems that manage the telecommunications network as a whole, whereas conventional management systems have handled only the remote control of transmission equipment, especially monitoring alarms produced by the equipment. In conventional network management methods, configuration changes, such as creation of new end-to-end connections, have been laborious and time-consuming, as the end result consists of several configuration events the pre-requisite of which is that the maintenance staff of the network first gets an overall view of the situation and then decides on configuration changes required in individual network elements. In new network management systems, on the contrary, an overall view of the network and its condition is produced within the system, and the system itself gives the required configuration commands to each transmission equipment. As a consequence, all configuration changes can be performed significantly more rapidly than previously. Such developments have been accelerated by the freeing of competition in the field of telecommunications.

Figure 1:
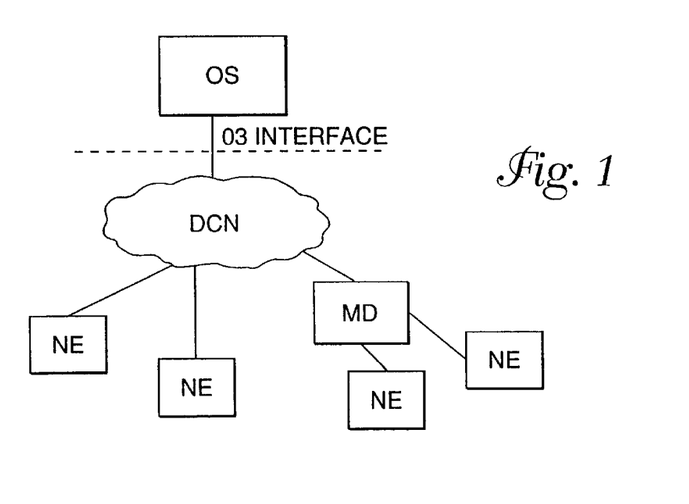
FIG. 1 illustrates a telecommunications network management architecture.

The above-mentioned recommendation M.3010 specifies the management architecture as shown in FIG. 1. The architecture basically consists of one or more operations systems OS connected to a data communication network DCN communicating with an actual telecommunications network which is to be managed and which includes the network elements NE managed. It is to be noted that the connections of the data communications network and those of the telecommunications network are logically distinct, although they can be implemented physically in one and the same cable. Logically, there are thus two networks: (a) a network providing services to customers, and (b) a network maintaining the service provisioning network. The management of certain transmission equipments (network elements) further requires a separate Mediation Device MD, which mainly acts as a protocol converter between a Q3 interface complying with the recommendations and transmission equipments that do not understand the protocol applied in the interface but use their own proprietary protocol. New SDH equipment, for instance, can be connected directly to the Q3 interface, whereas older PDH equipment requires a Mediation Device.

Figure 2:
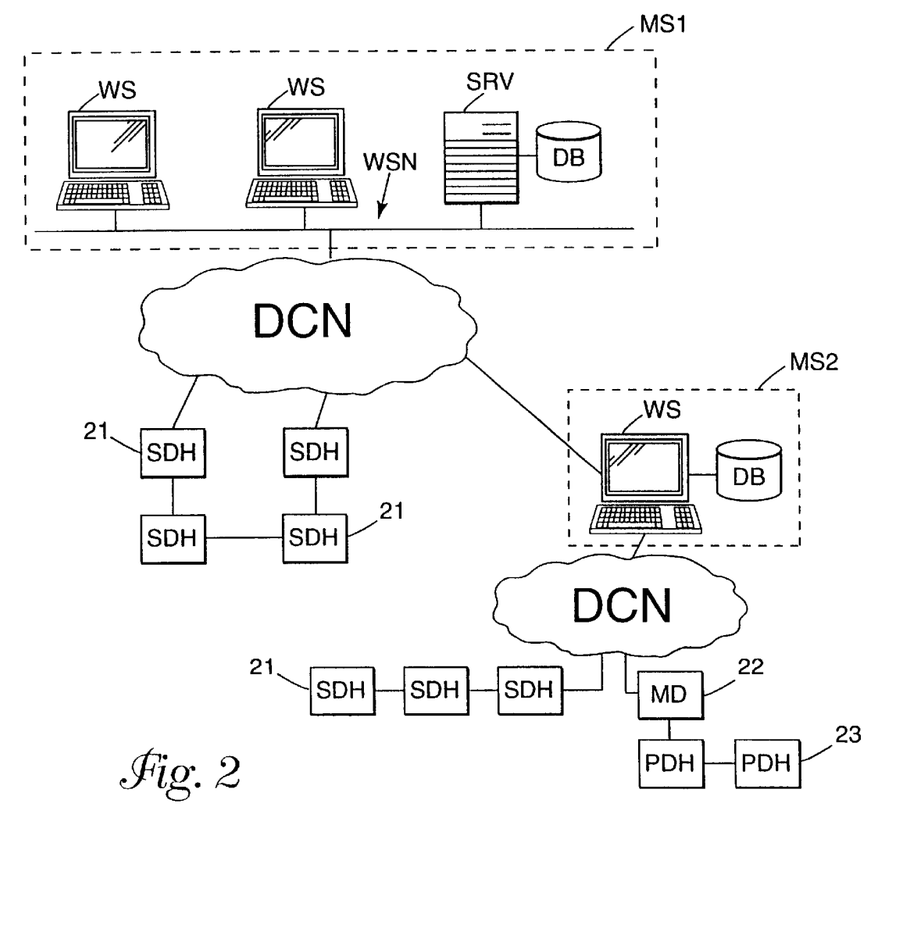
FIG. 2 shows an example of a management network for a combined SDH and PDH network.

In practice, a management network for a combined SDH and PDH network may be e.g. such as shown in FIG. 2. Users (network operator staff) sitting at the operation centre use network management work stations WS connected to a separate local area network WSN, which may be e.g. an Ethernet network. The management system is typically distributed in several computers of the local area network, one of the computers being a dedicated application server SRV having a database DB containing information necessary for managing the network. In its practical embodiment, the local area network further comprises e.g. necessary back-up devices (like DAT drives or mirrored disks) and event-logging printers (not shown).

The management system is connected via the above-mentioned Q3 interface e.g. to the SDH network. A variety of alternatives have been defined for the Q3 interface, so that the interface may be e.g. an X.25 type packet switched interface or an Ethernet LAN interface. (The packet switched interface is useful if the operator in charge of the network management also otherwise uses a packet switched network.) In practice, control channels between the SDH network elements 21 are established in the overhead bytes of the STM-N signal (N=1, 4, 16), so that control signals between SDH equipments propagate with the pay-load signal (that is, also in the same physical network). Such control channels established in the overhead bytes are called Embedded Control Channels, and they are formed e.g. in the STM-I frame by the section overhead bytes D1 to D12.

PDH equipments, on the contrary, need manufacturer-specific solutions, wherefore they have to be connected to the management system through a separate mediation device 22.

The management system may also be hierarchical so that different geographical areas have their own smaller management systems that together form an integral management network. For instance, a management system covering one country may be divide geographically into smaller management systems operating in different parts of the country. Each smaller management system takes care of the management of the network portion in the concerned geographical area. In the example of FIG. 2, management systems MS1 and MS2 geographically apart from each other form together a single common management system and management network.

Network management standards are nowadays largely based on so-called object-oriented descriptions, though the standards do not require the use of this technique. Objects are data structures in a network management system, which describe the functions and state of a network component. An object is thus an element having certain attributes ("I am like this") and certain operations ("I can do these things"). (In the object-oriented approach, objects with the same data structure (attributes) and the same behaviour (operations) are grouped into a class. A specific implementation of an operation is called a method and each object is said to be an instance of its class.) A typical object is e.g. a cross-connection device with certain attributes (cross-connections that are active) and certain methods (e.g. make cross-connection and release cross-connection).

In a telecommunications network management system, objects can be physical ones or logical ones. Physical objects are elements that form part of the physical network. Such objects are e.g. the above-mentioned network elements (a network element is any piece of telecommunication equipment that works as a single unit to provide telecommunication functions) or physical connections (such as optical fibres, twisted pair cables, coaxial cables, radio links or satellite links). Logical objects are logical entities that do not form a single piece of the physical network. Such objects are e.g. paths and circuits. (A path is a connection of a fixed bit rate and format between two physical interfaces within the network. A circuit is a connection set up for a customer, between two physical interfaces on the boundary of the network. Thus, a circuit usually comprises several consecutive paths.)

A network object may have a number of different attributes. Some attributes (such as "fault state") are used by several different types of object. In addition, for some types of network object (such as a route), it is convenient to define an attribute which consists of a collection of other attributes.

Typical attributes are e.g. "availability status", "fault state" and "operational state". The attributes have different possible values, e.g. fault state can have values:

OK. There are no problems.

Warning. There are outstanding faults, but these do not affect services.

Degraded. Some or all of the services provided by the object are degraded.

Failed. All the services provided by the object are lost.

Unknown. The fault state of the object is unknown.

The "operational state", in turn, can have e.g. two different values:

Enabled. The object can operate, either completely or in part.

Disabled. The object cannot operate at all.

One of the problems relating to a management system is how to be able to manage a wide diversity of equipments using protocols of different kinds.

First, a network to be managed comprises devices with very different basic functions, such as multiplexers or cross-connection devices. Second, there are older and newer versions of devices effecting the same function, and such versions may be technologically quite different from each other, e.g. PDH and SDH equipment effecting the same function (such as cross-connection). The properties of the same type of equipment (such as cross-connection devices) vary with the manufacturer; the different versions of one and the same device may also differ from each other even though the manufacturer is the same.

BRIEF SUMMARY OF THE INVENTION

The purpose of the present invention is to provide a novel network management system which is able to simply and rapidly take into account a large variety of network elements included in and to be added to a network to be managed. This is achieved by means of the system according to the invention, which is characterised by what is disclosed in the characterising portion of attached claim 1.

The idea of the present invention is to divide the devices used in the telecommunications network to be managed into categories; to present the device representing each category as generic objects in the management system, the generic objects having the basic properties corresponding to the concerned category (ability to perform certain functions, such as cross-connection); and to perform a conversion at the interface between the network to be managed and the management system so as to convert the device so that it, as viewed from the direction of the management system, corresponds to the generic objects representing within the system the device category which the device in question belongs to. According to the invention, the conversion at the interface is carried out from the internal object model of the particular device category to the external object model of the particular device, and vice versa.

If a new equipment, say, a cross-connection device from a new manufacturer is added to the system, all that needs to be done is to add a new interface process to the system for that device, i.e. the rest of the system does not necessarily need any changes. The new interface process converts the specific message format coming from that device to the generic cross-connection device format of the system. By representing this new kind of cross-connection device as a simple basic cross-connection device it can easily be added to the system. If the new device, however, has some special features (e.g. indicator lights that can be switched on in certain situations), and these features are to be utilized, a new object representing this feature has to be added to the system. However, an advantage of the invention is that the new device can be included in the system very rapidly by representing it by means of the interface process as a basic device corresponding to the concerned category and having the same attributes and operations as the object already available in the system.

BRIEF DESCRIPTION OF THE SEVERAL VIEWS OF THE DRAWING

The invention and its preferred embodiments will be described below in greater detail with reference to the example the attached drawing, in which.

DETAILED DESCRIPTION OF THE INVENTION

Figure 3:
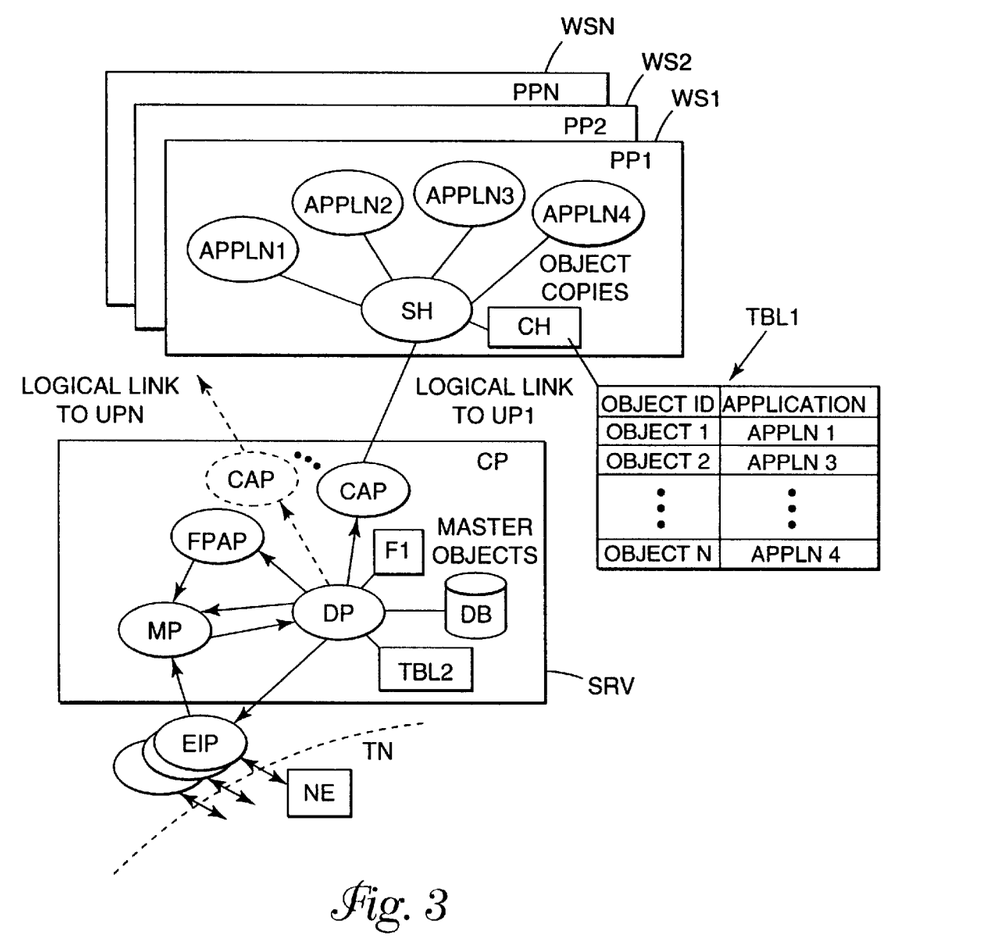
FIG. 3 illustrates the functional architecture of the management system according to the present invention in its basic form.

The functional architecture of the management system according to the present invention is illustrated in FIG. 3. A system with this kind of architecture is able to operate e.g. in the system shown in FIG. 2. The system comprises a single core part CP and one or more peripheral parts PP1 . . . PPN, which are connected to the core part of the system. In this example, each peripheral part is intended for one user (operator employee) of the system.

The system typically has a dedicated core computer, such as a server SRV (also shown in FIG. 2). The core part of the system maintains an updated model of the state and operation of the telecommunications network TN to be managed, of which a single network element is shown in the figure. As described earlier, the core part uses objects to keep up this model. The core computer SRV is connected to one or several workstations WS1 . . . WSN each including one peripheral part. The functional processes of the system, which run on the core computer and on the workstations, have been marked with ovals. These processes will be described in the following.

An application (indicated with the references APPLN1 . . . APPLN4 in FIG. 3) is a functional system block which allows the user to configure the 25 network and view network events on the screen of the workstation. The application is thus a system part offering the system's services to the user. An individual workstation is therefore also called an application server.

A Session Handler SH is a functional system part that handles a single user's session with the system and forwards messages between the core and the user's applications. The Session Handler can be associated with the initial system log-on window through which a user logs on and establishes a session with the core. The Session Handler starts up various applications according to commands given by the user. When the user logs out, the Session Handler performs the necessary closing-down and de-registering operations to terminate the session (the term registering will be explained later).

A Core Access Process CAP verifies that the Session Handler belongs to a known user on a known host. Having done so, it acts as the gateway to the system core. For each CAP in the core part there is a corresponding Session Handler in the peripheral part.

A Database Process DP controls access to the database DB to store persistent information (master objects of the management system). The main functionality of this process is:

to convert persistent objects to and from a storable format, to store the current state of all persistent objects in the database DB and to keep that database up to date by the use of change and event messages sent to it by a Modelling Process MP of the core part, to handle the forwarding of event information to interested parts of the system.

The Modelling Process MP is responsible for maintaining the currency of the core's model of the network to be managed and dealing with changes to it. The main functions of the Modelling Process are:

to accept change and event indications from either Interface Process IP or CAP (i.e. either from the network or from the user) and validate them, to apply changes to the model if they are valid and to determine the results of these changes, to pass the changes to an appropriate Interface Process IP, if the changes require corresponding changes in the network to be managed, to generate events based on the changes and events received (e.g. fault events on paths and circuits).

The Interface Process IP is a functional system part that converts data from the external world (data from the network to be managed) into the internal world of the management system. As far as the system user is concerned, he or she just sees a network element NE, like a multiplexer or a cross-connection device, without having to know the manufacturer or the version of the device. Different types of Interface Processes are used for different classes of equipment. The main functionality of each IP is:

to monitor the network for events and to exchange notifications with the network, to translate these events and notifications into equivalent events that are applied to the Modelling Process MP, to pass these events and notifications to the Modelling Process, to accept changes received from the Modelling Process; translate them into the format of the network model; and send them to the network and then inform the Modelling Process when all commands relating to each original change have succeeded, failed or timed out.

In fact, the Interface Processes could also be included in the core part, but FIG. 3 shows them separate, as they form the interface of the management system with the external world.

A Fault Propagation Agent Process FPAP is a functional system part that works out the actual impact of a received event in the system. In order to be able to do this the FPAP uses information about the object class in question. This information it receives from the Database Process DP.

As the network elements cannot provide all the information needed by the applications, the database DB must store information e.g. about individual network elements and interconnections and interrelations between the network elements, the operations the network elements are capable of performing, and the services provided by the network elements. This information is stored in the form of an object model representing the transmission network TN in terms of objects and their attributes and methods performed on these attributes. Thus, an object is the representation, in the object model, of one of the resources to be managed.

Applications use these objects that form the image of the network to be managed within the system. Therefore, they have to get objects from the core part of the system. An application can also create a new core object to database DB, e.g. as a result of a user command.

Applications also register to receive various events. The registration is passed to the Session Handler and further to the core part of the system. The registration is stored in the form of a filter F1 in association with the Database Process DP. This filter finds out on the basis of the event type, to which Core Access Processes and to which applications a certain type of event is to be transmitted (i.e. what users are interested in a certain type of event). Events from the core of the system are duplicated in the Session Handler and sent to all applications which have registered to receive them. In this way, all of the user's applications can receive the event at the same time, so that information presented to the user by the different applications is consistent.

In this way the core part of the system knows to which application a certain event has to be transmitted. This also allows unwanted events to be filtered out as soon as possible (in the core) and reduces the bandwidth used between applications and the core part of the system. The core part is thus able to filter events up to the application level. It is also possible to use filters in steps so that the core part knows only up to the level of the Session Handler what event has to be transmitted to the peripheral part. The Session Handler thereafter has a new filter, which indicates in which event a specific application inside the concerned Session Handler is interested. The first alternative, however, is to be preferred in that it does not make the peripheral part (Session Handler) too complicated.

The use of filters is described in the Applicant's parallel patent application GB-95-26600.3, which is referred to for a more detail description and which is hereby incorporated by reference.

In the management system of FIG. 3, part of the objects stored in the core part of the management system are also placed as copies in a cache CH at each Session Handler SH. (Although a cache is a certain kind of memory, in this connection caching means only that a copy of something is kept to get fast access to it.) Thus, the Session Handler has a copy of any object an application has fetched from the core part of the system. The Session Handler thus also stores object-specific information indicating which one of its applications uses a specific object. This information can be stored e.g. in the form of a table TBL1 shown in FIG. 3. The core part correspondingly knows which Session Handler has a copy of a specific master object. This information can be stored in the form of a table TBL2 in association with the Database Process.

At the system start-up, the Session Handler has no copies of objects. When the application needs a copy for the first time, the copy is fetched from the core part. As the transmitted retrieve message includes information specifying the object to be retrieved and the application that needs the copy, the Session Handler is able to keep up a table (TBL1) indicating which application uses a specific object, and the Database Process is able to keep up a table indicating which Session Handler uses a copy of a specific master object.

If an application fetches an object of which the Session Handler already has a copy, the application receives a copy of the object from the Session Handler without having to interact with the core part of the system. When the application ceases using an object, it transmits a message as an indication of this to the core part through the Session Handler, as a result of which the copy is removed from the memory of the Session Handler and the tables are updated accordingly. If the object is needed again, the copy is fetched from the core in the same way as at the system start-up.

When changes are made to an object in an application, the Session Handler immediately communicates them to all other applications in the session that use said object. (The Session Handler receives information on the change from the application making the change, updates its own copy, and passes the events to all other applications using said object.) These changes are also transmitted through the Session Handler to the core, which reapplies the changes to the master objects to keep the state of the master copies consistent with the state of the copies in the peripheral part.

A system architecture of the type described above is described in the Applicant's parallel patent application GB-95-26612.8, which is referred to for a more detailed description and which is hereby incorporated by reference. This application describes e.g. the operation of the different processes more fully.

Figure 4:
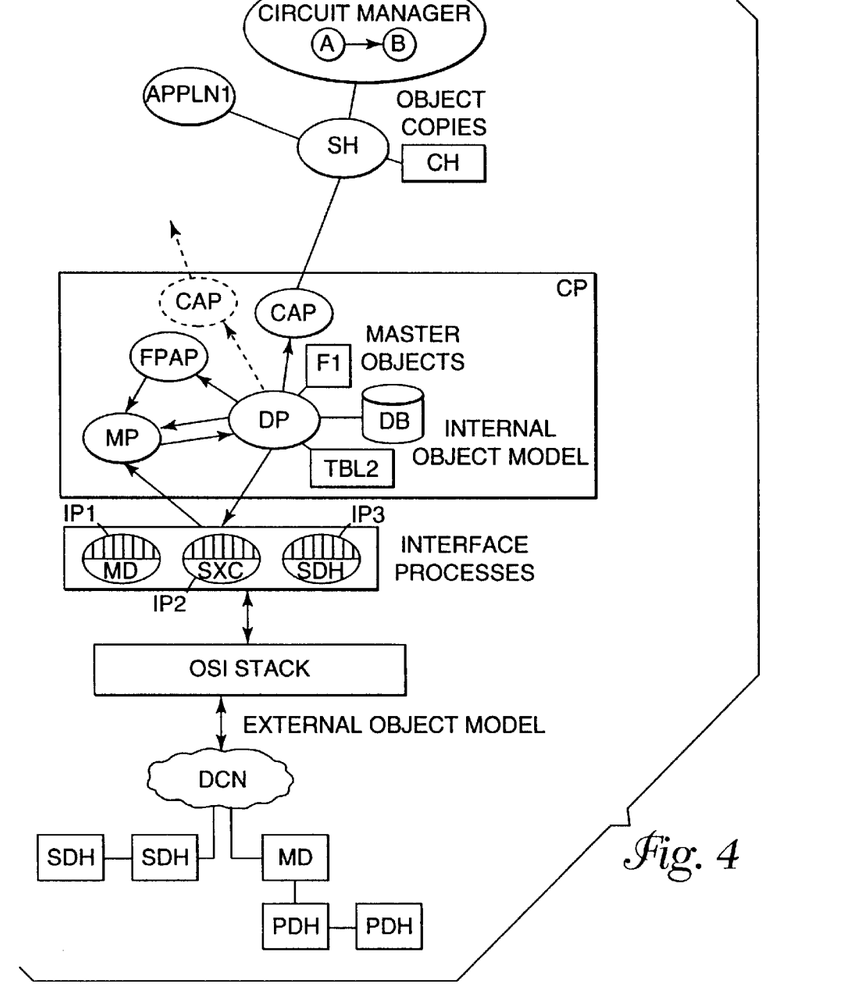
FIG. 4 illustrates the idea of interface processes in the system according to FIG. 3.

As the present invention, however, relates mainly to the interface between the system and the external world, the following description will concentrate on this interface. FIG. 4 illustrates the principle according to the present invention by means of a preferred example where the devices of the network to be managed are divided into three different categories indicated with the references MD, SXC and SDH. The category MD, which corresponds to the Interface Process IP1, includes mediation devices under which old PDH devices are connected (cf. FIG. 1). The category SXC, which corresponds to the Interface Process IP2, includes all cross-connection devices provided with the Q3-interface, and the category SDH, which corresponds to the Interface Process IP3, includes all SDH devices of the network. This division is advantageous in that the model of the basic device stored within the system is as close as possible to the standards, and so the interface process itself can be implemented in a relatively straightforward manner.

Accordingly, even though the transmission network to be managed may contain several types of elements providing, say, cross-connect capabilities, they all have the same attributes and behaviour from the application point of view. Thus, when the user of the system gives a command that leads to a cross-connect transaction, it is handled in the same way for all types of cross-connection devices through the core part of the system, until an Interface Process is asked to handle the transaction. The Database Process knows internally the type of this Cross Connect device (the Interface Process is identified by the value of one of the attributes) and thus knows which of the Interface Processes the transaction should be sent to. The Interface Process then knows the particular device in question, whereby it is able to command it in the right manner to cause the cross-connection to take place. To create an end-to-end circuit may require several cross-connect transactions to be sent, whereby it is possible that they all are sent to different Interface Processes (as the cross-connection devices in the path can all be of different type).

Thus, according to the present invention the system side of every Interface Process is generic (i.e. exactly the same in all the Interface Processes) so that the same protocol is used between the Modelling Process (or the Database Process) and the Interface Processes, regardless of what Interface Process is in question. (in FIG. 4, this feature is shown by parallel vertical lines in the Interface Process.)

The network side, on the contrary, is different for each Interface Process IP1 . . . IP3. In this way it is possible to isolate the changes needed to the system when new kind of network elements are added to the network as low in the system as possible. If a new equipment, say, a new type of cross-connection device from a new manufacturer is added to the system, all that needs to be done is to add a new interface process to the system for that device. The new interface process converts the specific message format coming from that device to the generic cross connection device format of the system. This generic format is represented by the objects already available in the system. In this way the non-generic part of the changes required to add a new kind of a device to the system can be embedded in the interface part while the rest of the system remains generic.

As is obvious from above, the interface processes perform a conversion between the internal object model of the management system and the external object model. The object model of the system is used (a) to determine which external objects internal changes are related to when sending changes to the network, and (b) to generate the internal changes related to an external change when changes are received from the network. The external object model includes the information on how to translate external messages to internal changes, and vice versa.

The following two detailed examples relating to cross-connection devices clarify the function of the Interface Processes.

The scenario between the Modelling Process and an Interface Process are independent of the type of the Interface Process and of the operation being performed. Thus, the scenario for the MD IP will be the same as that for the SXC IP.

The first example shows what happens when the management system gives a request to a cross connection device to connect two termination points (abbreviated to TPs in the following).

1. The Circuit Manager (which is the application that performs cross connections) connects two endpoints (A and B, see FIG. 4) together. Inside the system this results in an information element being added to the TPManager::crossConnectList attribute. (The name before the colons, TPManager, here stands for the concerned object class, and the name after the colons, crossConnectList, stands for the attribute or operation.) The added element contains the internal identifying numbers (TPUniqueIds) for the two points to be connected. (The abbreviation id will be used below for the identification number and any other identifying code.)

2. The Circuit Manager then forms a message describing the change. This message will contain, among others, object id (TPManager object id), attribute id (of the crossConnectList attribute) and the new value of the attribute. The message will be indicated with reference AVCEvent (Attribute Value Change Event) below. The data in question are included in a special object indicated with reference changeItem. This object is placed in an AVCEvent which is sent to the Modelling Process as a transaction message.

3. The Modelling Process MP receives the transaction message, extracts the AVCEvent information and works out that it has to send this AVC to IP2 (SXC IP). This is done by getting the concerned cross-connection device on the basis of the received TPManager object id (TPManager object has a getManagedElement method which is used to get the cross-connection device object.) One of the attributes of the cross-connection device object then tells which one of the Interface Processes is in question. The AVCEvent is then placed in a record which is sent to IP2 inside a message.

4. When the Interface Process receives the message, it extracts the record from the message, stores the record and sends an acknowledgement message back to the Modelling Process.

5. The Interface Process uses the received id of the crossConnectList attribute to call a cross-connect method (CnvSXCME::crossConnectOperation).

6. This method gets the TPManager object using the received object id. The Interface Process then gets the object representing the cross-connection device class on the basis of the TPManager object id in the same way as the Modelling Process above. The changeItem object received has an attribute changeType. In this case, the value of this attribute is "AddItem", which means that the concerned operation is a connect operation (not a disconnect operation which is similar to a connect operation except that the value of the changetype is "RemoveItem" instead of "AddItem".) The Interface Process then calls the connectOperation method.

7. The connectOperation method takes the two TPUniqueIds (which can either be sent within the changeItem or requested separately on the basis of the received crossConnectList attribute id) and converts them to the external distinguished names of the termination points (abbreviated to DN below). This conversion is done by a method called CnvSXCME::TPUniqueIdToDN. It is this method that understands how the external DNs are related to the internal TPUniqueIds. At this stage, it is thus necessary to find an address (DN) for the cross-connection device interface, which is on a card located in a certain slot of the rack of the cross-connection device. In this case, there are two interfaces for each card.

8. The TPUniqueIds are first used to get the corresponding TP object. This object can then be used to get the interface in question (TP object has a GetinterfaceId method). The interface object is then used to fetch the card object which contains an attribute with a certain index representing a certain interface in the card. This index of the interface in the card is then used to calculate the external DN for the Termination Point. (DN is the unique name in the external model of the interface in the cross connection device in question.)

9. The external DNs are then used to build the CMISE cross-connect action (M-ACTION), which is sent to the cross-connection device in question. The cross-connection device then knows on the basis of the DN contained in the message to which physical point the action is directed.

10. The cross-connection device replies, indicating the success or failure of the operation. The received information is used to set a status code in the record mentioned in step 3 above, indicating if the operation succeeded or not.

11. A message including said status code is sent to the Modelling Process, which uses the code to tell the application (Circuit Manager) if the operation succeeded or not.

The example relating to the opposite direction is an alarm handling procedure. It shows what happens e.g. when a physical cable is disconnected from a 2 Mbit/s interface card in a cross-connect node and the cross-connection device sends an associated alarm to the management system.

1. The alarm is received in a form specified by the External Object Model. (When the Q3 protocol is used, CMISE-primitive M-Event-Report is received, which contains parameters indicating essential alarm data).

2. The unique name of the object instance in the External Model which is sending this alarm is the following pair:

sxcNodeId, TTP
where the value of sxcNodeId is a unique node identification number among all cross-connection nodes and the value of TTP is the physical interface in a card (every card contains two interfaces, A and B, as disclosed earlier). The value for TTP is calculated as follows:
for interface A: TTP=2* slot number,
for interface B: TTP=2* slot number+1.

3. The internal object for this physical cross-connection node is fetched on the basis of the sxcNodeId value received.

4. Then the associated internal card object must be found. This can be asked from the cross-connection object, which can be fetched on the basis of SXCNodeId received from the database. The cross-connection object has a method which returns the card object by giving the slot number, which in this case is equal to the value of TTP divided by two. In this case, the remainder (zero or one) indicates which one of the interfaces is in question.

5. Now the right internal interface object can be asked from the card object.

6. The Interface Process IP has now solved out the right interface object in the internal model having this alarm. From now on the Interface Process will proceed in a generic way. It will now create a generic internal alarm object having attributes like "severity", "reason" and "additional text". These attributes describe the fault according to the attributes in an external alarm.

7. The Interface Process sends this internal alarm to the Modelling Process, also indicating which internal interface object will have this alarm.

The alarm data are further transferred to all processes that have indicated that they are interested in receiving an event of this type.

As shown in FIG. 4, communication with the network to be managed preferably takes place in compliance with the Q3 protocol (which is the most important of the protocols defined in the standards). The interface defined for the Q3 protocol in the standards is based on a 7-layer OSI (Open Systems Interface) protocol stack, of which there are different alternatives, depending on the network to which connection is made. However, all alternatives are based at the highest application layer on the us of the CMISE (CMISE, Common Management Information Service Element is defined e.g. in the standards ISO 9595 and ISO 9596. CMISE is an application service element of the application layer of the OSI reference model, offering services for controlling and monitoring objects to be managed.) CMISE-primitives are thus messages defined in the standards, and the above-mentioned "M-ACTION" is one of these messages (a message which is sent to request an action, like "connect").

On transmitting from the network, a message sent by each device contains the address of the interface process to which the message is being forwarded.

Figure 5:
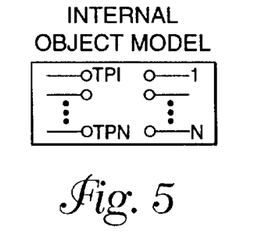
FIGS. 5 and 6 schematically illustrate the object model conversion performed by the interface process.
Figure 6:
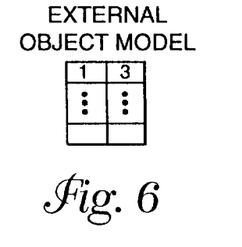

FIGS. 5 and 6 schematically illustrate the object model conversion performed by the interface process. FIG. 5 shows by way of example one possible representation of a cross-connection device in the internal object model of the system, and Figure shows by way of example the object model of the device. In the internal object model, the cross-connection device has been modelled as a device having N termination points TP1 to TPN and N output lines. A cross-connect operation is performed by commanding the termination point and the output line to be connected. However, the device itself may comprise a table shown in FIG. 6, for instance. The numbers of the input and output lines thus have to be written into the first and second free elements of the table, and so the device automatically interconnects the lines. The interface process corresponding to the device thus alters a command which asks to connect a specific termination point to a specific output line into a command which asks to write predetermined numbers in the table elements.

Even though the Q3 protocol has been used above as an example of the protocol used between the interface processes and the network, it is equally possible to use any other known protocol, such as Q1, TCP/IP tai SMNP. It is also to be noted in this connection that it is preferable that the associated standards (M.3100) are taken into account in the design of the internal object model, as the conversion from and to the standardised environment can thereby be made in the easiest possible way.

Even though the invention has been described above referring to the example of the attached drawing, it is obvious that the invention is not restricted to that, but it can be modified in many ways within the scope of the inventive idea presented above and in the attached claims. As mentioned above, the management system includes a variety of objects, representing both logical and physical entities. In the enclosed claims all these objects are set forth as "the objects that relate to the network elements to be managed", i.e. objects that represent the managed environment.

What is claimed is:

1. A system for managing a telecommunications network, said telecommunications network comprising several network elements to be managed by the system,
said system comprising a management centre having at least one workstation accomplishing a man-machine interface and allowing a manager to control the system, and the system being capable of providing the manager with information on the network;
said at least one workstation being connected to a database including information about the network to be managed;
said information being in the form of objects that relate to the network elements to be managed and in the form of references between the different objects;
said references indicating the dependencies between the objects, wherein said management centre is connected to said network elements by data communication links such that the manager can initiate an operation on and receive information from a network item to be managed;
characterized in that
the transmission network to be managed is connected to the management system by means of interface processes;
the devices used in the network are classified into different device categories;
said system comprises for each device category an interface process which converts a device belonging to the concerned device category so that it appears, as viewed from the direction of the management system, as a generic basic device corresponding to a device represented by corresponding objects within the management system; and
said devices are classified from the viewpoint of the interface processes in such a way that:
one device category essentially includes all PDH (Plesiochronous Digital Hierarchy) devices connected under known mediation devices;
one device category essentially includes all cross-connection devices provided with a telecommunications protocol interface; and one device category essentially includes all SDH (Synchronous Digital Hierarchy) devices.

2. A system according to claim 1, characterized in that said interface processes convert the internal protocol of the management system into a telecommunications protocol, and vice versa.

3. A system according to claim 1, characterized in that said telecommunications protocol is the Q3 protocol.

4. A system according to claim 1, characterized in that in order to speed up fetching said objects, said objects stored in the management system are also stored as copies in a cache memory operationally coupled to a session handler.

5. A system according to claim 2, characterized in that said telecommunications protocol is the Q3 protocol.

* * * * *